Patented Dec. 30, 1947

2,433,392

UNITED STATES PATENT OFFICE 2,433,392

DICYANDIAMIDE PICRATE

Joseph H. Paden and Alexander F. MacLean, Stamford, Conn., assignors to American Cyanamid Company, New York, N. Y., a corporation of Maine No Drawing. Application October 25, 1945, Serial No. 624,579

4 Claims. (Cl. 260—551)

This invention relates to the picrate salt of dicyandiamide and to methods of preparing the same.

It has been recorded in the literature that dicyandiamide, a neutral compound having low ionization constants would not form salts with acids in aqueous solutions. In spite of this argument which refutes the formation of such salts, it has now been discovered that the picrate salt of dicyandiamide can be prepared.

The picrate salt is prepared by reacting dicyandiamide with picric acid in a solvent for either or both of the reactants such as ethers, esters, ketones, acids, and the like.

The following example will serve to illustrate the preparation of the picric salt of dicyandiamide:

Example

| Reactants | Molar Ratio |
|---|---|
| Dicyandiamide | 1.00 |
| Picric acid | 1.22 |
| Acetic acid, glacial | 4.85 |

A mixture of dicyandiamide and picric acid dissolved in acetic acid is stirred mechanically at 40° C., and after a clear solution is obtained, the reaction mixture is cooled to below 40° C. to effect crystalization. The crystals of dicyandiamide picrate are filtered, washed consecutively with methyl ethyl ketone, containing a small amount of picric acid, and benzene, and dried under vacuum at 50° C. By means of a potentiometric titration the molecular weight was found to agree closely with the theoretical value of 313.

Dicyandiamide picrate does not have a sharp melting or decomposition point, and since the analytical data checks the theoretical composition, the optical and crystallographic properties are presented herein to characterize the picrate. Dicyandiamide picrate is a yellow-orange, equant solid which crystallizes in the orthorhombic system and which has the crystallographic forms (hko) (hol) and sometimes (100), cleaves along the plane (100), and has a positive optic sign. It is to be understood that the crystallographic symbolts "h" and "k" are used in conjunction with the letters "o" and "l" and not with the numerals zero and one. In white light the dicyandiamide picrate has the following refractive indices: $\alpha = 1.660$; $\beta = 1.720 \pm 0.005$; and $\gamma = 1.83 \pm 0.01$. The apparent optic axial angle as observed in air is estimated to be greater than 94°, and the true optic axial angle estimated therefrom is greater than 54°. The optic axial plane or principal optic section is (010). The principal vibration directions are as follows: $\alpha$ is parallel to "c"; $\beta$ is parallel to "b"; and $\gamma$ is parallel to "a." It is to be understood that the symbols "a," "b," and "c" refer to the crystallographic axes.

The picrate salts of dicyandiamide are useful as chemical intermediates, chemotherapeutic agents, insecticides, synthetic resins and for other purposes.

While the invention has been described with particular reference to specific embodiments, it is to be understood that it is not to be limited thereto, but is to be construed broadly and restricted solely by the scope of the appended claims.

What is claimed:

1. Dicyandiamide picrate.

2. A method of preparing dicyandiamide picrate which includes the step of reacting dicyandiamide with picric acid below substantially 50° C.

3. A method of preparing dicyandiamide picrate which includes the step of reacting in an organic solvent dicyandiamide with picric acid below substantially 50° C.

4. A method of preparing dicyandiamide picrate which includes the steps of reacting in acetic acid dicyandiamide with picric acid in a molar ratio of substantially 1:1.22 below substantially 50° C., and recovering the dicyandiamide picrate therefrom.

JOSEPH H. PADEN.
ALEXANDER F. MacLEAN.

REFERENCES CITED

The following references are of record in the file of this patent:

UNITED STATES PATENTS

| Number | Name | Date |
|---|---|---|
| 1,939,365 | Piccard | Dec. 12, 1933 |
| 2,131,127 | Ter Horst | Sept. 27, 1938 |
| 2,223,935 | Daniels et al. | Dec. 3, 1940 |
| 2,265,942 | Hill | Dec. 9, 1941 |
| 2,323,869 | Jayne et al. | July 6, 1943 |
| 2,364,594 | Thurston et al. | Dec. 5, 1944 |

FOREIGN PATENTS

| Number | Country | Date |
|---|---|---|
| 332,681 | Germany | Jan. 27, 1921 |

OTHER REFERENCES

Hoag, Liebigs Annalen, vol. 122, pp. 29 and 30 (1862).

Davis, Jour. Am. Chem. Soc., vol. 43, pp. 2232–2233 (1921).

Davis, Jour. Am. Chem. Soc., vol. 43, p. 669 (1921).